US010911675B2

(12) United States Patent
Murakami

(10) Patent No.: US 10,911,675 B2
(45) Date of Patent: Feb. 2, 2021

(54) METHOD FOR PROVIDING SHAKE CORRECTION, SIGNAL PROCESSING DEVICE PERFORMING THE METHOD, AND IMAGING DEVICE INCLUDING THE SIGNAL PROCESSING DEVICE

(71) Applicant: SAMSUNG ELECTRONICS CO., LTD., Suwon-si (KR)

(72) Inventor: Yasuaki Murakami, Yokohama (JP)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 84 days.

(21) Appl. No.: 16/225,709

(22) Filed: Dec. 19, 2018

(65) Prior Publication Data

US 2019/0208127 A1    Jul. 4, 2019

(30) Foreign Application Priority Data

Dec. 28, 2017  (JP) ................................ 2017-254329
Sep. 14, 2018  (KR) ........................ 10-2018-0110289

(51) Int. Cl.
*H04N 5/232* (2006.01)
*G02B 27/64* (2006.01)

(52) U.S. Cl.
CPC ....... *H04N 5/23267* (2013.01); *G02B 27/646* (2013.01); *H04N 5/2328* (2013.01); *H04N 5/23216* (2013.01); *H04N 5/23258* (2013.01)

(58) Field of Classification Search
CPC .............................................. H04N 5/23267
See application file for complete search history.

(56) References Cited

U.S. PATENT DOCUMENTS 9,307,148 B1 * 4/2016 Baldwin ............ H04N 5/23267
2009/0128640 A1 * 5/2009 Yumiki .............. H04N 5/23248
                                                          348/208.6
(Continued)

FOREIGN PATENT DOCUMENTS

JP    2007-208832    8/2007
JP    2016-145856    8/2016
(Continued)

OTHER PUBLICATIONS

Lee et al.; "Apparatus for Vibration Compensation of Gyro Sensor of Mobile Camera"; Apr. 4, 2016; Dong Woon Anatech Co., Ltd; pp. 1-5; English Translation (Year: 2016).*

*Primary Examiner* — Cynthia Segura
(74) *Attorney, Agent, or Firm* — F. Chau & Associates, LLC

(57) ABSTRACT

A signal processing device for compensating for shaking of an imaging device is provided. The signal processing device includes a motion determination circuit configured to determine motion type information indicating whether a motion of the image device was caused by a hand-shake or was intended by a user based on motion detection information detected by a gyro sensor, a calculation circuit configured to calculate a correction coefficient based on the motion type information, a correction circuit configured to correct motion information calculated from the motion detection information based on the correction coefficient, and a processor configured to synchronize image data of the image device with the corrected motion information.

17 Claims, 5 Drawing Sheets

(56) References Cited

U.S. PATENT DOCUMENTS

| | | | |
|---|---|---|---|
| 2010/0138180 A1* | 6/2010 | Sugihara | B25J 9/163 |
| | | | 702/94 |
| 2010/0158493 A1* | 6/2010 | Miyasako | H04N 5/23212 |
| | | | 396/55 |
| 2013/0135487 A1* | 5/2013 | Ueda | H04N 5/23258 |
| | | | 348/208.4 |
| 2014/0140684 A1 | 5/2014 | Imanishi | |
| 2014/0204226 A1* | 7/2014 | Murakami | H04N 5/23287 |
| | | | 348/208.1 |
| 2014/0327789 A1* | 11/2014 | Tsuchiya | H04N 5/23258 |
| | | | 348/208.11 |
| 2015/0036007 A1* | 2/2015 | Wakamatsu | H04N 5/23258 |
| | | | 348/208.2 |
| 2017/0041547 A1* | 2/2017 | Takeuchi | H04N 5/23287 |
| 2017/0257574 A1* | 9/2017 | Honjo | H04N 5/23258 |
| 2018/0167558 A1* | 6/2018 | Hirai | G09G 5/377 |
| 2018/0213153 A1* | 7/2018 | Iso | H04N 5/23229 |
| 2018/0255245 A1* | 9/2018 | Miyazawa | H04N 5/23254 |
| 2018/0310812 A1* | 11/2018 | Kuriyama | A61B 1/00188 |
| 2019/0174062 A1* | 6/2019 | Miyahara | H04N 5/23258 |

FOREIGN PATENT DOCUMENTS

| | | | |
|---|---|---|---|
| KR | 101608828 B1 * | 4/2016 | G03B 5/00 |
| WO | 2013-021728 | 2/2013 | |

\* cited by examiner

METHOD FOR PROVIDING SHAKE CORRECTION, SIGNAL PROCESSING DEVICE PERFORMING THE METHOD, AND IMAGING DEVICE INCLUDING THE SIGNAL PROCESSING DEVICE

CROSS-REFERENCE TO RELATED APPLICATION(S)

This U.S. non-provisional patent application claims the benefit of priority under 35 U.S.C. 119 to Korean Patent Application No. 10-2018-0110289 filed on Sep. 14, 2018 in the Korean Intellectual Property Office, and Japanese Patent Application No. 2017-254329 filed on Dec. 28, 2017 in the Japanese Intellectual Property Office, the disclosures of which are incorporated by reference in their entirety herein.

BACKGROUND

1. Technical Field

The present inventive concept relates to a method for providing shake correction in an imaging device, a signal processing device that performs the method and an imaging device having the signal processing device.

2. Discussion of Related Art

A shake correction function is typically provided in imaging devices such as digital cameras and Smartphones. Methods of shake correction include optical shake correction and electronic shake correction. To implement shake correction, a motion detector such as a gyro sensor is provided in an imaging device to obtain motion information based on motion of the image device. In electronic shake correction, a shake correction device modifies image data obtained from the imaging device based on the obtained motion information.

A shake correction device using electronic shake correction may combine the motion information with information from other sensors to calculate a correction angle to correct the image data. However, since a value of the correction angle changes rapidly, a frame memory may be required, which increases manufacturing costs and the size of the device.

SUMMARY

At least one embodiment of the present inventive concept provides a signal processing device capable of performing a highly accurate hand-shake correction in a simple manner, an imaging device, a blur angle calculation method, and a blur angle calculation program.

According to an exemplary embodiment of the present inventive concept, a signal processing device for compensating for shaking of an imaging device is provided. The signal processing device includes a motion determination circuit configured to determine motion type information indicating whether a motion of the imaging device was caused by a hand-shake or was intended by a user based on motion detection information detected by a gyro sensor, a calculation circuit configured to calculate a correction coefficient based on the motion type information, a correction circuit configured to correct motion information calculated from the motion detection information based on the correction coefficient, and a processor configured to synchronize image data of the image device with the corrected motion information.

The gyro sensor may detect an angular velocity as the motion detection information. The signal processing device may further include a first integration circuit configured to integrate the angular velocity detected by the gyro sensor to calculate an angle as the motion information. The correction circuit may correct the angle calculated in the first integration circuit using the coefficient. Thus, the signal processing device may calculate an angle based on the angular velocity detected by the gyro sensor and correct the detected angle.

The first integration circuit may apply the angular velocity detected by the gyro sensor to the angle corrected in the correction circuit to calculate an angle. Thus, the signal processing device may correct the angle calculated in the first integration circuit and update the angle.

The calculation circuit may determine whether an amount of time elapsed since an imaging device has started being driven is within a predetermined time period, and when an amount of time elapsed since the imaging device has started being driven is within a predetermined time period, the calculation circuit may output a correction coefficient to the correction circuit, used when the imaging device is being driven.

The calculation circuit may obtain an angle from the angular velocity detected by the gyro sensor, and when a change in the obtained angle exceeds a predetermined setting value, the calculation circuit may output a correction coefficient to the correction circuit, used when an available correction range is exceeded.

The signal processing device may further include a low frequency detector configured to detect a low frequency component from the angular velocity detected by the gyro sensor. In this case, the calculation circuit may apply a value of the low frequency component detected by the low frequency detector when calculating the correction coefficient. Thus, the signal processing device may perform an angle correction to the shaking of a frequency caused by a hand-shake.

The signal processing device may further include a second integration circuit configured to receive an input of the angular velocity detected by the gyro sensor and the angle corrected in the correction circuit. The second integration circuit may calculate a blur angle of the imaging device based on the angle calculated by integrating the angular velocity detected by the gyro sensor and the angle corrected in the correction circuit. Accordingly, the signal processing device may calculate the blur angle by considering both the angle, based on the angular velocity detected by the gyro sensor, and the corrected angle.

The correction circuit may set an angle before correction obtained in one earlier calculation to be the angle calculated in the first integration circuit when the motion type information indicates the motion was intended by the user.

The calculation circuit may calculate a correction coefficient such that an amount of a change in the calculated correction coefficient becomes a maximum update value when the amount of a change in the calculated correction coefficient exceeds the maximum update value.

The signal processing device may further include an attribute correction unit configured to correct the angular velocity based on a unique attribute of the gyro sensor before the angular velocity detected by the gyro sensor is input to the first integration circuit.

According to an exemplary embodiment of the present inventive concept, an imaging system includes the image device, the gyro sensor, the signal processing device configured to receive an input of a signal from the imaging device and the gyro sensor, and an image modification circuit configured to modify an image from the imaging device based on motion information output from the signal processing device.

According to an exemplary embodiment of the present inventive concept, a method for compensating for shaking of an imaging device is provided. The method includes integrating an angular velocity detected by a gyro sensor to calculate an angle, determining motion type information indicating whether an angle change was caused by a handshake or was intended by a user based on the angular velocity detected by the gyro sensor, calculating a correction coefficient based on of the motion type information, correcting the angle based on the correction coefficient, calculating a blur angle based on the corrected angle, and adjusting image data captured by the image device during the angle change using the calculated blur angle.

According to an exemplary embodiment of the present inventive concept, non-transitory computer readable medium configured to store code including instructions executable by a processor to perform a method for compensating for shaking of an image device is provided. The method includes integrating an angular velocity detected by a gyro sensor to calculate an angle, determining motion type information indicate whether an angle change was caused by a hand-shake or was intended by a user based on the angular velocity detected by the gyro sensor, calculating a correction coefficient based on of the motion type information, correcting the angle based on the correction coefficient, calculating a blur angle based on the corrected angle, and adjusting image data captured by the image device during the angle change using the calculated blur angle.

BRIEF DESCRIPTION OF DRAWINGS

The present inventive concept will be more clearly understood from the following detailed description, taken in conjunction with the accompanying drawings, in which.

DETAILED DESCRIPTION OF THE EXEMPLARY EMBODIMENTS

Figure 1:
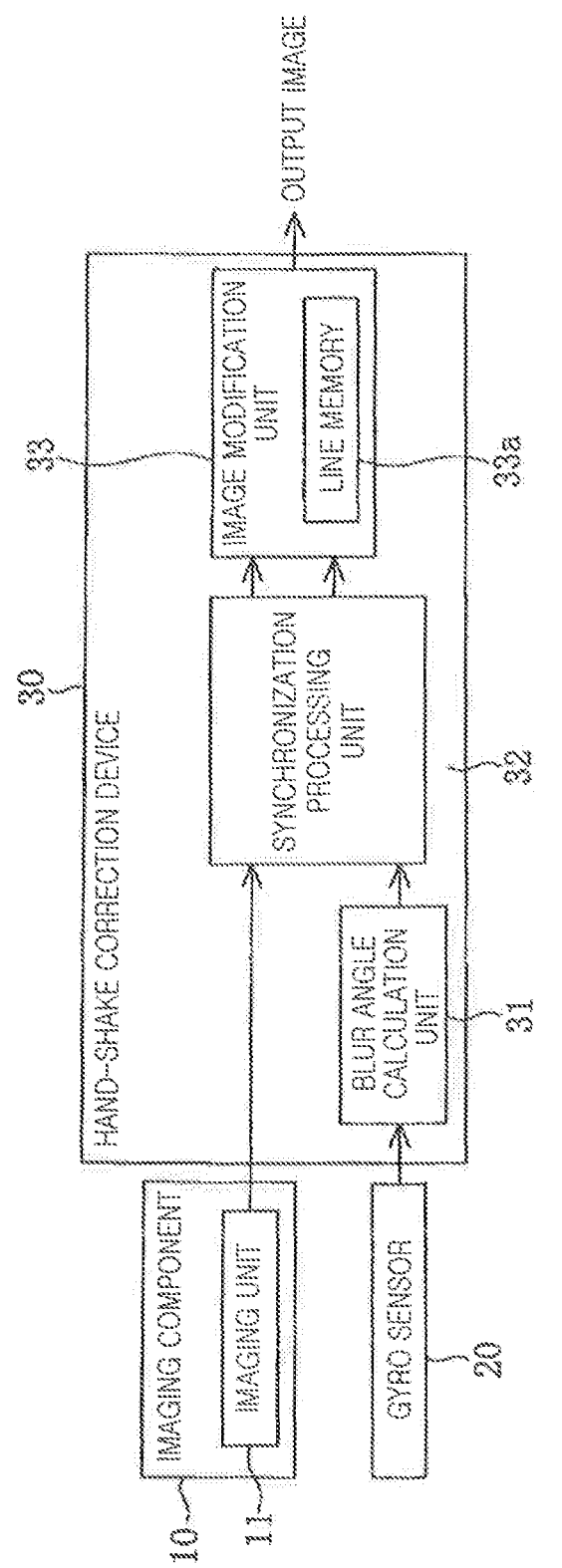
FIG. 1 is a schematic configuration diagram illustrating an imaging device according to an exemplary embodiment in the present inventive concept.

Hereinafter, embodiments of the present inventive concept will be described as follows with reference to the attached drawings. The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

The terms "unit," "engine," "model," "module," "system," "component," "element," "interface," and the like, may generally refer to computer related entities such as hardware, combination of hardware and software, or software. For example, the term "unit" may refer to a process currently executed in a processor, a processor, an object, an executable, an executing thread, a program and/or a computer, but the term is not limited thereto. An application currently being driven on a controller and the controller, for example, may be one of a plurality of components. One or more components may be provided in a process and/or an executing thread, and a component may be localized in a single computer or may be distributed among two or more computers.

In the descriptions and drawings, the same elements having the same function will be indicated by the same reference numeral.

A shake correction device (e.g., a signal processing device) will be described with reference to FIG. 1. The shake correction device may be referred to as a hand-shake correction device since a user typically holds an imaging device in one or both hands and movement (e.g., shaking) of one or both hands can result in blurry images unless a shake correction or hand-shake correction is performed. In an exemplary embodiment, the signal processing device is located in the imaging device. The imaging device may output an image collected in an imaging component 10 as image data, and store the image. In an embodiment, the imaging device includes the imaging component 10 having an imaging unit 11, a gyro sensor 20, a hand-shake correction device 30. The imaging unit 11 may output the obtained image data to the hand-shake correction device 30. As the imaging unit 11, a complementary metal oxide semiconductor (CMOS) image sensor may be used, for example. However, the imaging unit 11 is not limited thereto, and may be also implemented by other types of image sensors. For example, the imaging unit 11 could be implemented by a charge-coupled device (CCD) image sensor. The gyro sensor 20 may detect an angular velocity as motion detection information of the imaging unit 11. The gyro sensor 20 may output the detected angular velocity to the hand-shake correction device 30. As an example, the gyro sensor 20 may be implemented by a gyroscope that measures orientation and angular velocity.

The hand-shake correction device 30 (e.g., a signal processing device) may include a blur angle calculation unit 31, a synchronization processing unit 32, and an image modification unit 33. In an embodiment, the blur angle calculation unit 31 calculates motion information representing a motion of the imaging unit 11 based on the angular velocity detected by the gyro sensor 20. The motion information may refer to a blur angle to correct by the imaging unit 11. In an embodiment, the synchronization processing unit 32 synchronizes the image data from the imaging unit 11 with the blur angle from the blur angle calculation unit 31. The synchronization processing unit 32 may consider the time from the exposure time of the imaging unit 11 to the time of the synchronization processing unit 32 at which the image data is received. The synchronization processing unit 32 may also consider a sampling rate and a latency of the gyro sensor 20. In addition, the synchronization processing unit 32 may consider the amount of time it takes for a signal to reach the synchronization processing unit 32, after going through the blur angle calculation unit 31, from the gyro sensor 20. For example, the total amount of time could be the amount of time it takes for motion information to be output from the gyro sensor 20 to the blur angle calculation unit 31, plus the amount of time it takes for the blur angle calculation unit 31 to calculate the blur angle from the motion information, plus the amount of time it takes for the blue angle calculation unit 31 to output the blur angle to the synchronization processing unit 32. In the case in which the imaging unit 11 performs an exposure by a rolling shutter method, there may be a discrepancy in exposure time on every line of an image. In this case, the synchronization processing unit 32 may also consider a level of the discrepancy on every line of the image and perform synchronization on every line.

The data (e.g., image data) from the imaging unit 11 or the data (e.g., motion information) from the gyro sensor 20 may be input to the hand-shake correction device 30 through an analog-to-digital (A/D) converter (not illustrated). In an exemplary embodiment, a digital signal processing (DSP) circuit or digital signal processor performs the functions of the blur angle calculation unit 31, the synchronization processing unit 32, and the image modification unit 33. In another embodiment, the blur angle calculation unit 31, the synchronization processing unit 32, and the image modification unit 33 are each implemented by separate circuits or integrated into a single circuit.

The image modification unit 33 may have a line memory 33a configured to store the image data by line unit. For example, the line memory 33a may include rows of memory cells, where each row is used to store one row of the image data. In an embodiment, the image modification unit 33 performs an image modification process on the image data based on the blur angle synchronized in the synchronization processing unit 32. In an exemplary embodiment of the image modification process, the image modification unit 33 performs coordinate conversion based on the blur angle on every line in relation to the image data. The image modification unit 33 may perform image modification on the basis of a coordinate obtained after the conversion. When the image modification unit 33 performs the coordinate conversion, the image modification unit 33 may simultaneously perform a coordinate conversion for other causes, such as a lens distortion. The image modification unit 33 may output the image data on which the image modification process is performed.

Figure 2:
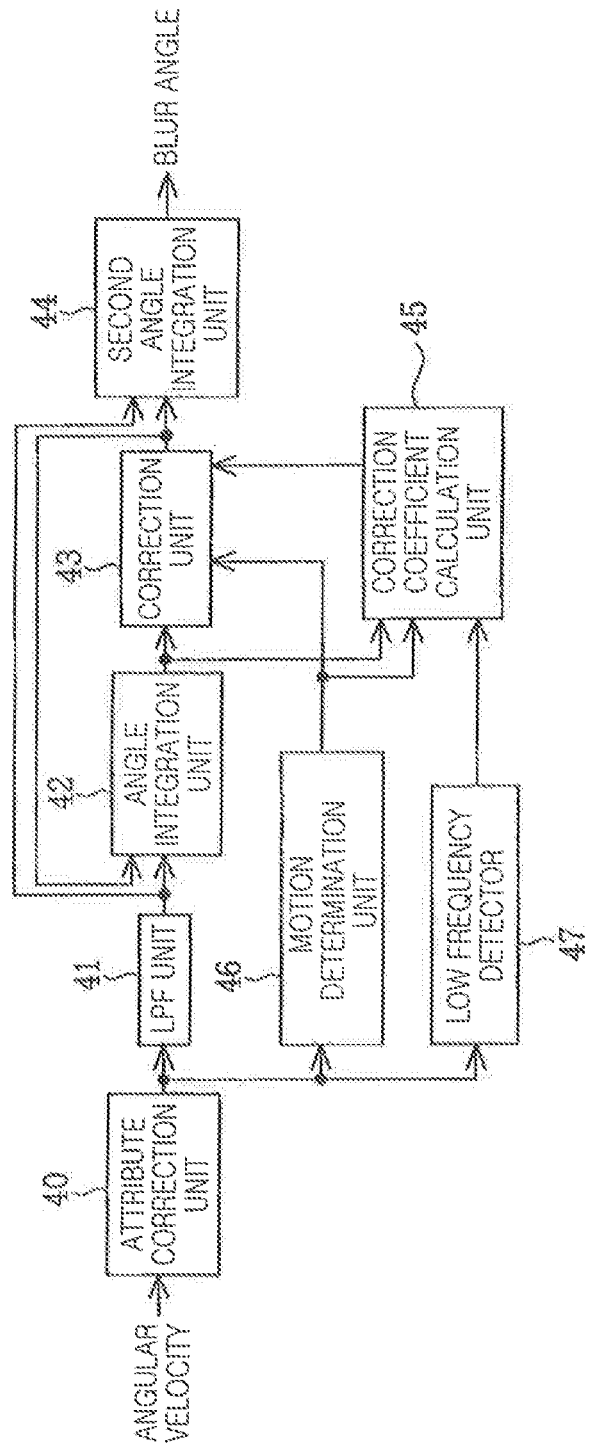
FIG. 2 is a configuration diagram illustrating a blur angle calculation unit.

A blur angle calculation unit 31 will be described with reference to FIG. 2. As described above, an angular velocity from a gyro sensor 20 may be input to the blur angle calculation unit 31. The angular velocity may indicate the rate of change of angular position of a rotating body. The angular velocity may be measured in angle per unit time such as radians per second. The angular velocity input to the blur angle calculation unit 31 may be corrected in an attribute correction unit 40. The attribute correction unit 40 may correct a unique attribute of the gyro sensor 20, such as a gyro drift, and other axis sensitivities.

The angular velocity corrected in the attribute correction unit 40 may be output to a low pass filter 41, a motion determination unit 46, and a low frequency detector 47. The low pass filter 41 may cut off a component of a high frequency band among data of the angular velocity. Accordingly, a noise component may be eliminated. A cutoff frequency of the low pass filter 41 may be range from 100 Hz to 200 Hz, but the cutoff frequency is not limited thereto.

In an exemplary embodiment, the motion determination unit 46 determines motion type information indicating whether a motion was caused by an unintentional hand-shake or was intended by a user (e.g., panning for a panoramic image). The motion intended by a user may be, for example, a panning movement in a single direction. In an exemplary embodiment, the motion determination unit 46 includes a separate low pass filter or receives an output of the low pass filter 41. In an exemplary embodiment, a cutoff frequency of the low pass filter of the motion determination unit 46 is slightly higher than a frequency generated in the hand-shake motion. The cutoff frequency may range from 10 Hz to 30 Hz, but the cutoff frequency is not limited thereto. For example, the cutoff frequency may be set to other ranges. In an exemplary embodiment, the motion determination unit 46 determines a motion as being intended by a user when an output value from the low pass filter 41 is a predetermined setting value or higher. When the output value from the low pass filter 41 is lower than the predetermined setting value, the motion determination unit 46 determines a motion as being caused by an unintentional hand-shake. However, the method of determining whether the motion is intended or unintentional is not limited thereto, since other methods may be used.

The low frequency detector 47 may detect a low frequency component from the data of the angular velocity. In an embodiment, the low frequency detector 47 is configured to detect a motion of a frequency lower than a frequency caused by hand-shake motion. The low frequency detector 47 may include a separate low pass filter or receive an output of the low pass filter 41 in which a low frequency is set as a cutoff frequency. The cutoff frequency of the low frequency detector 47 may range from 1 to 9 Hz, or may be greater than several tens of Hz. However, the means of the frequency detection is not limited to a low pass filter, since other means may be used.

The data of the angular velocity output from the low pass filter 41 may be input to an angle integration unit 42 (e.g., an integration circuit or an integrator). In an embodiment, the angle integration unit 42 performs a time-integration operation on the data of the angular velocity to calculate an angle. The data of the angle calculated in the angle integration unit 42 may be output to a correction unit 43. The correction unit 43 may correct the input angle on the basis of a correction coefficient.

The data of the angle corrected in the correction unit 43 may be input to the angle integration unit 42. The angle integration unit 42 may integrate an angular velocity from the gyro sensor 20 in relation to the angle corrected in the correction unit 43 and calculate a new angle. For example, the angle integration unit 42 may perform a time-integration operation on data of a first angular velocity to calculate a first angle, the correction unit 43 may correct the first angle and feedback the corrected first angle to the angle integration unit 42, and the angle integration unit 42 may perform a time-integration operation on data of a second angular velocity using the fed back corrected first angle to calculate a second angle.

The correction coefficient used in the correction unit 43 may be calculated in a correction coefficient calculation unit 45. The correction coefficient may be configured to modify a reference position of hand-shake correction, depending on circumstances of an imaging device. Accordingly, a blur angle to be output may be adjusted to be changed within a range in which correction is available.

An output value from the motion determination unit 46, the low frequency detector 47, and the angle integration unit 42 may be input to the correction coefficient calculation unit 45. The correction coefficient calculation unit 45 may output different correction coefficients depending on information detected by the motion determination unit 46, the information of whether a motion is intended by a user or unintended (e.g., due to hand-shaking). In an exemplary embodiment, the correction coefficient calculation unit 45 calculates a correction coefficient based on the low frequency component detected by the low frequency detector 47. In addition, the correction coefficient calculation unit 45 may output different correction coefficients depending on whether the angle calculated in the angle integration unit 42 exceeds the available correction range.

The information from the motion determination unit 46 may be input to the correction unit 43 as well. The correction unit 43 may adjust the amount of change in angle so that it is not significantly increased in a case in which a motion intended by a user is detected. The corresponding configuration will later be described in greater detail.

The angle calculated in the correction unit 43 and the data of the angular velocity passing through the low pass filter 41 may be input to a second angle integration unit 44. In an exemplary embodiment, the second angle integration unit 44 performs a time-integration operation on the angular velocity to calculate an angle which has not been corrected in the correction unit 43. The second angle integration unit 44 may calculate a blur angle to be output on the basis of the angle corrected in the correction unit 43 and the angle which has not been corrected in the correction unit 43.

Each of the functional units of the blur angle calculation unit 31 may be configured as a digital signal processing circuit as described above. The digital signal processing circuits forming the blur angle calculation unit 31 may be implemented as a single circuit. Also, the digital signal processing circuit may be implemented by a plurality of circuits that execute functions of the units of FIG. 2.

Figure 3:
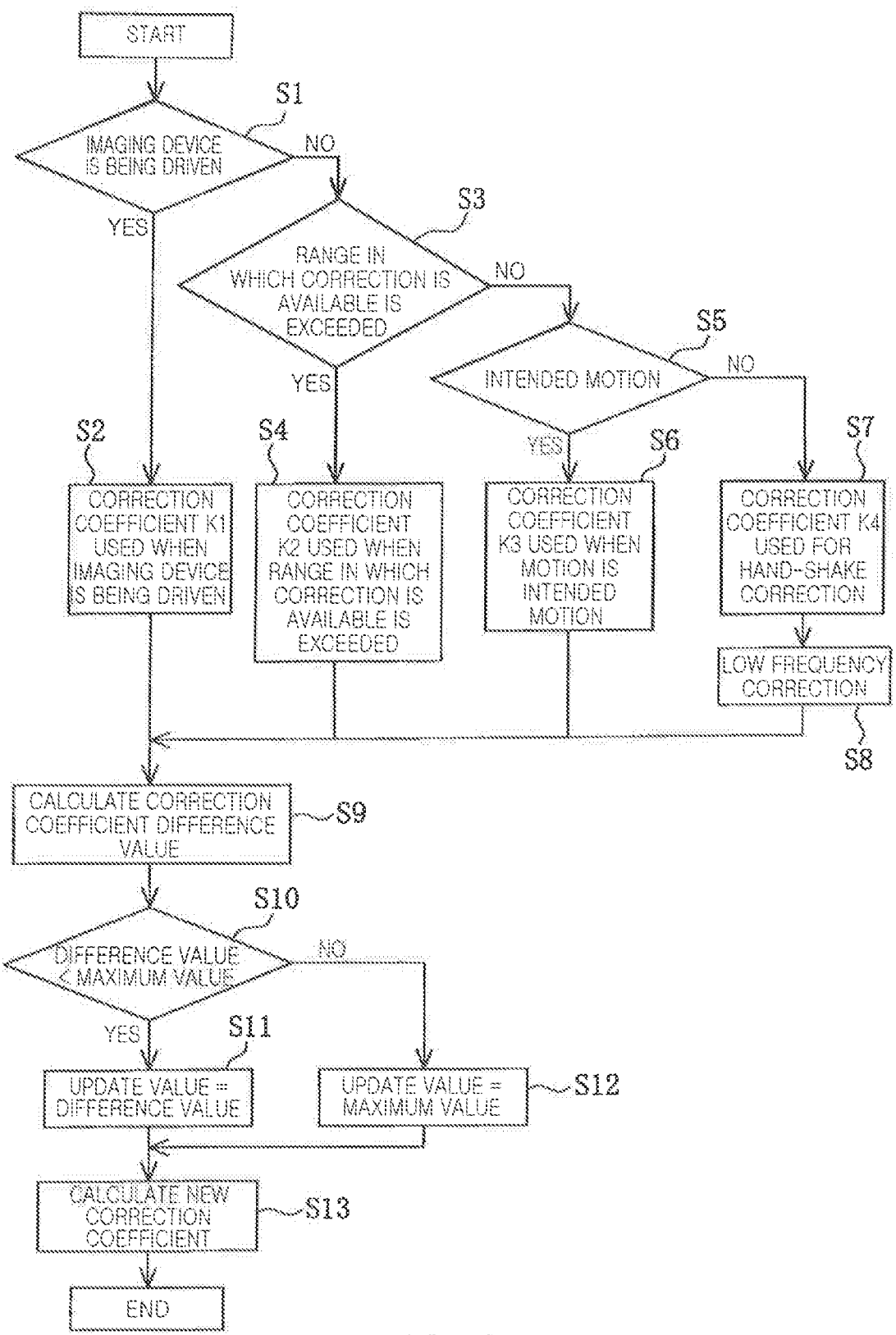
FIG. 3 is a flowchart illustrating a method of calculating a correction coefficient according to an exemplary embodiment of the inventive concept.

A correction coefficient calculation of a correction coefficient calculation unit 45 will be described with reference to FIG. 3. The correction coefficient calculation unit 45 determines whether an imaging device is currently in a driven state or not (S1). In an exemplary embodiment, the correction coefficient calculation unit 45 determines that the imaging device is currently being driven when the time elapsed since an imaging device has started being driven is within a predetermined time period. When it is determined that the imaging device is currently being driven in operation S1, the correction coefficient calculation unit 45 employs a correction coefficient K1 when the imaging device is being driven. The correction coefficient K1 used when the imaging device is being driven may be a predetermined value. After the imaging device has started being driven, an angular velocity from a gyro sensor 20 may not be sufficiently integrated in a second angle integration unit 44. Also, the gyro sensor 20 could output an unstable value after the imaging device has started being driven. The correction coefficient calculation unit 45 may alleviate the effect of the insufficient integration of the angular velocity and the output of an unstable value using the correction coefficient K1 when the imaging device is being driven.

When it is determined in operation S1 that the imaging device is not currently being driven, the correction coefficient calculation unit 45 may obtain an angle calculated in an angle integration unit 42. Thereafter, the correction coefficient calculation unit 45 determines whether a change in the obtained angle exceeds a predetermined setting value (S3). The determination above may determine whether an angle change exceeds a range in which a correction is available. When an angle change exceeds the range in which correction is available in operation S3, the correction coefficient calculation unit 45 calculates a correction coefficient K2 used when a correction range is exceeded (S4). The correction coefficient calculation unit 45 may adjust a blur angle to correct to be within the range in which correction is available using the correction coefficient K2 when a correction range is exceeded.

When it is determined in operation S3 that an angle change does not exceed the range in which correction is available, the correction coefficient calculation unit 45 determines whether the angle change is intended or not on the basis of an output of a motion determination unit 46 (S5). When the angle change is an intended angle change, the correction coefficient calculation unit 45 calculates a correction coefficient K3 when a motion is an intended motion. The correction coefficient K3 used when a motion is an intended motion, may be a predetermined value. When the intended angle changes, an angle of an imaging unit 11 significantly changes. In an exemplary embodiment, the correction coefficient calculation unit 45 adjusts a reference position of hand-shake correction, to be dependent on the angle change using a correction coefficient K3 when a motion is an intended motion.

When the angle change is not an intended angle change, the correction coefficient calculation unit 45 calculates a correction coefficient K4 for correcting a common (e.g., unintended) hand-shake (S7). The correction coefficient K4 for correcting a common hand-shake may be corrected depending on a value of a low frequency component detected by a low frequency detector 47 (S8). In an exemplary embodiment, if a predetermined setting value is "α," K4 after correction is calculated by "[K4 before correction]+[a value of a low frequency component]×α." Accordingly, the correction coefficient may be a correction coefficient in which the effect of a low frequency component is considered.

In an exemplary embodiment, when a common hand-shake is corrected, a correction coefficient is corrected using a value of a low frequency component. The correction of a correction coefficient using a value of a low frequency may also be performed in different circumstances. For example, even in the case in which the range where correction is available is exceeded, a correction coefficient may be corrected using a value of a low frequency. Also, the setting value "a" used for the correction using a value of a low frequency may be configured to change depending on the time elapsed since the correction of a correction coefficient using a value of a low frequency.

The correction coefficients K1, K2, K3 and K4 corresponding to the respective circumstances may be determined by considering an attribute of the gyro sensor 20 to be used. Also, a shape, a weight, a usage form, and a frame rate of the imaging device may be considered as well. The correction coefficient may also be determined by considering other factors.

Once the correction coefficient is calculated, the correction coefficient calculation unit 45 calculates a difference between a previously calculated correction coefficient and a currently calculated correction coefficient (S9). The correction coefficient calculation unit 45 determines whether the calculated difference value is lower than a predetermined maximum value (S10). When the difference value is lower than the maximum value, an update value is set to the difference value (S11). When the difference value is higher than the maximum value, an update value is set to the maximum value (S12). Accordingly, when a correction coefficient changes significantly, the change may be prevented. By preventing a radical change in a correction coefficient, the effect of the hand-shake correction may become significant. Also, a maximum value of the difference value may be configured to change depending on the time elapsed since a correction coefficient starts changing.

Once the update value is determined, the correction coefficient calculation unit 45 calculates a new correction coefficient (S13). The new correction coefficient may be calculated by adding the update value determined in S11 or S12 to the previously calculated correction coefficient. The correction coefficient calculation unit 45 may output the correction coefficient calculated in this operation to a correction unit 43.

In an embodiment, a correction unit 43 corrects an angle using a correction coefficient calculated in a correction coefficient calculation unit 45. In the case in which an input angle is "$\theta_{in}$," a corrected angle is "$\theta_{out}$," and a correction coefficient is "K," the correction unit 43 may perform a calculation of "$\theta_{out}=\theta_{in}-\theta_{in}/2^K$" to calculate the corrected angle.

A result of a motion determination unit 46 may be input to the correction unit 43. In the case in which the motion determination unit 46 determines that a motion is intended by a user, an angle of an imaging unit 11 may change significantly. In this case, the correction unit 43 may perform the aforementioned calculation using an angle after correction, obtained in a previous calculation, instead of the input angle $\theta_{in}$. Accordingly, the effect of a radical angle change may be alleviated.

Figure 4A:
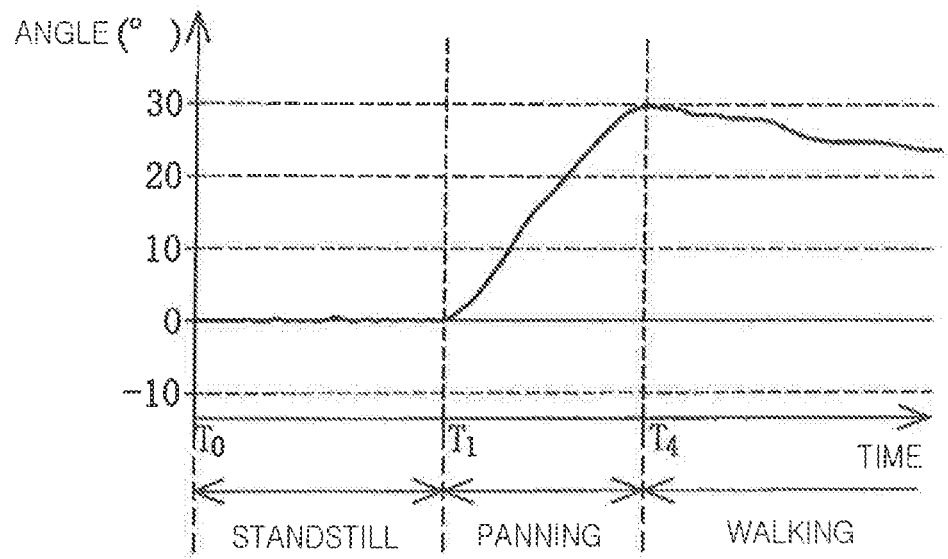
FIG. 4A is a graph showing changes in angle of an imaging unit over time.

FIG. 4A illustrates an example of a change in angle of an imaging unit 11 over time. In the example, a user is in a standstill state while holding an imaging device in his/her hand from the time $T_0$ to the time $T_1$. In this time period, an angle of the imaging unit 11 fluctuates around 0°. Also, a hand-shake occurs, and slight angle changes occur repeatedly. In the period from the time $T_1$ to the time $T_4$, the user is panning the imaging device in a horizontal direction. In this time period, the user intentionally changes the angle of the imaging device significantly. The period after the time $T_4$, the user is walking while holding the imaging device in his/her hand. In this period, slower angle changes also occur in addition to the hand-shake.

Figure 4B:
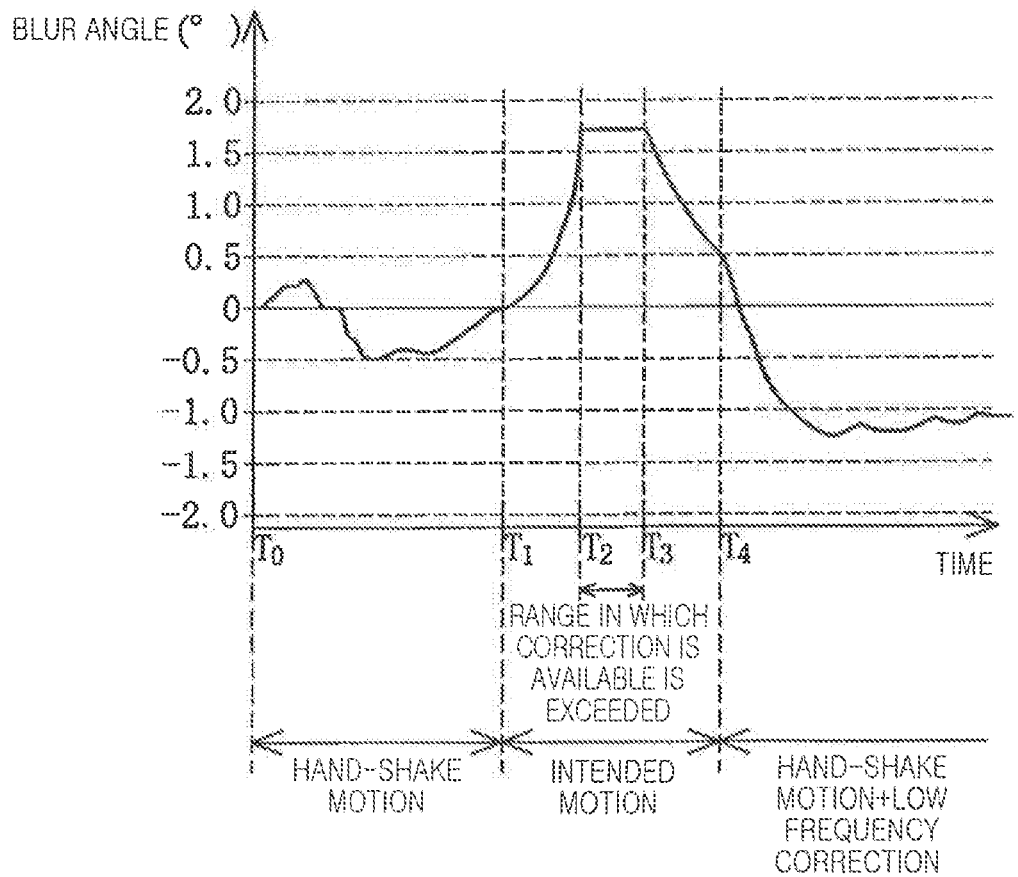
FIG. 4B is a graph showing an angle calculated in a blur angle calculation unit on the basis of the angle changes in FIG. 4A.

FIG. 4B illustrates an angle calculated in a blur angle calculation unit 31 on the basis of the angle changes in FIG. 4A. In the period from the time $T_0$ to the time $T_1$, an operation of a common hand-shake correction is performed. In this case, in a correction coefficient calculation unit 45, a correction coefficient K4 is selected as a reference value. As illustrated in the diagram, in the common hand-shake correction, a small range of a blur angle may be calculated with reference to the angle 0°.

In the period from the time $T_1$ to the time $T_4$, an operation corresponding to a motion intended by a user is performed. In this period which does not include the period in which a range where correction is available is exceeded, the correction coefficient calculation unit 45 selects a correction coefficient K3 as a reference value. In the section of the motion intended by a user, an angle changes rapidly. As described above, the correction unit 43 may perform an adjustment to alleviate the radical angle change.

In the period from the time $T_2$ to the time $T_3$, a blur angle exceeds the range in which correction is available. In the case in which the range where correction is available is exceeded, the correction coefficient calculation unit 45 may select a correction coefficient K2 as a reference value. As illustrated in the diagram, in the case in which the range where correction is available is exceeded is exceeded, the blur angle becomes a constant value. When the blur angle returns to a value within the range where correction is available at the time $T_3$, the correction coefficient calculation unit 45 may select the correction coefficient K3 as a reference value again. At the time $T_4$, a direction of the imaging device changes more significantly than at the time $T_1$, but a difference from a reference position (0°) of a blur angle may be maintained to be low. That is because the reference position of a blur angle continuously changes by the correction unit 43.

In the period after the time $T_4$, an operation of hand-shake correction is performed, and a correction of a correction coefficient using a low frequency component is also performed. Accordingly, even when a motion slower than a common hand-shake occurs, the reference position of a blur angle may change accordingly.

As described above, in the blur angle calculation unit 31 according to an exemplary embodiment, a signal processing device may change a correction coefficient depending on circumstances of the imaging device, and reflect the changed correction coefficient in the calculation of a blur angle. Accordingly, a signal processing device in an exemplary embodiment may dynamically change the reference position of a blur angle used in hand-shake correction depending on different circumstances. Thus, a blur angle may be maintained within a small angle range, and stability may be secured while a video image is taken. When a range of a blur angle is wide, an image modification unit 33 may be required to have a high level of storage capacity. In the signal processing device according to an exemplary embodiment, a range of a blur angle may be maintained to be as small as possible. Accordingly, a line memory 33a having a low level of storage capacity may be employed in a hand-shake correction device 30, and thus a size of the device housing the correction device 30 may be reduced and manufacturing costs may be reduced.

Figure 5:
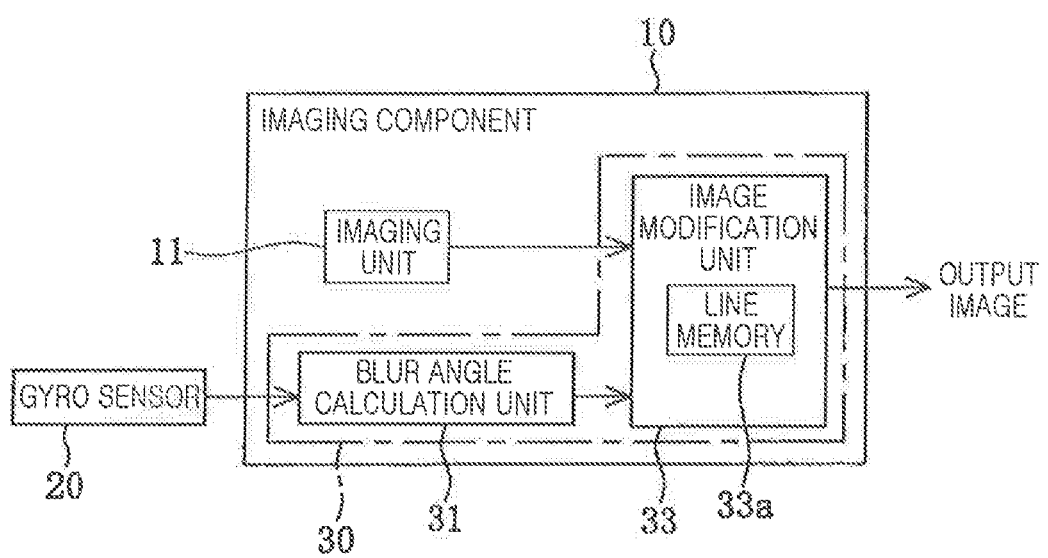
FIG. 5 is a schematic configuration diagram illustrating a modified example of an imaging device according to an exemplary embodiment of the inventive concept.

A modified exemplary embodiment of an imaging device having a signal processing device will be described with reference to FIG. 5. A hand-shake correction device 30 in the modified exemplary embodiment is embedded in or located within an imaging component 10. The imaging component 10 may include an imaging unit 11 and a hand-shake correction device 30. The hand-shake correction device 30 (e.g., a signal processing device) may include a blur angle calculation unit 31 and an image modification unit 33 having a line memory 33a. In the blur angle calculation unit 31, data of an angular velocity from a gyro sensor 20 may be input. The configuration of the blur angle calculation unit 31 may be the same as in FIG. 2. In this case, the hand-shake correction device 30 may be configured as a unit combined with a chip of the imaging component 10.

When the hand-shake correction device 30 is embedded in the imaging component 10, the size of an imaging device may be reduced.

The method of calculating a blur angle according to an exemplary embodiment described above may be applied to other types of devices besides the signal processing device. Thus, the method of calculating a blur angle may be provided as a computer program. In this case, the following steps may be executed in a computer. For example, a non-transitory computer readable medium may store code including instructions executable by a processor to perform the steps of the method.

First, an angle is calculated by integrating an angular velocity detected by a gyro sensor 20 (a first step). Motion type information indicating whether an angle change was caused by a hand-shake or was intended by a user is determined (a second step). The motion type information may be determined using the angular velocity. A correction coefficient for correcting the calculated angle is calculated on the basis of information of the determination of the angle change detected by the second step (a third step). The angle calculated in the first step is corrected on the basis of the correction coefficient calculated in the third step (a fourth step). A blur angle is calculated on the basis of the angle corrected in the fourth step (a fifth step). The specific method of the determination, the calculation, and the correction in each step may be the same as in the exemplary embodiments described above. Image data captured the imaging device while the angle change occurred can be adjusted based on the calculated blur angle to compensate for shaking of the image device. The adjusting of the image data may include synchronizing the image data with the calculated blur angle.

In at least one exemplary embodiment, the gyro sensor 20 and the hand-shake correction device 30 are provided in the imaging device, but the inventive concept is not limited thereto. For example, the gyro sensor 20 or the hand-shake correction device 30 may be mounted on the imaging device as additional components.

According to at least one of the aforementioned exemplary embodiments, when imaging is performed in the imaging device, the hand-shake correction may be stably performed. Also, a range of a blur angle of the hand-shake correction may be maintained to be as small as possible. Accordingly, a level of a storage capacity used in image modification may be configured to be relatively low, and a device housing the shake correction device may be reduced and manufacturing costs may be reduced.

Also, according to at least one of the aforementioned exemplary embodiment, a blur angle may be corrected properly immediately after the imaging device has started being driven. Also, even in the case where a range in which a correction is available is exceeded such that an angle of the imaging device is changed, a blur angle may be corrected properly. Further, even in the case where an angle of the imaging device changes significantly, the effect thereof may be alleviated. In addition, a radical change in correction coefficient may be prevented, and accordingly, hand-shake correction may be stably performed. Also, an accuracy of an angular velocity used in calculation of a blur angle may improve.

While exemplary embodiments have been shown and described above, it will be apparent to those skilled in the art that modifications and variations could be made without departing from the scope of the present invention.

What is claimed is:

1. A signal processing device for compensating for shaking of an imaging device, the signal processing device comprising:
   a motion determination circuit configured to determine motion type information indicating whether a motion of the imaging device was caused by a hand-shake or was intended by a user based on motion detection information detected by a gyro sensor;
   a calculation circuit configured to calculate a correction coefficient based on the motion type information;
   a first integration circuit configured to integrate a first angular velocity of the motion detection information to generate a first angle;
   a correction circuit configured to correct the first angle based on the correction coefficient, feed the corrected first angle back to the first integration circuit to generate a second angle from the corrected first angle and a second angular velocity of the motion detection information; and
   a processor configured to synchronize image data of the image device based on the second angle.

2. The signal processing device of claim 1, wherein the calculation circuit outputs the correction coefficient to the correction circuit upon determining that an amount of time elapsed since the imaging device has started being driven is within a predetermined time period.

3. The signal processing device of claim 1, wherein the calculation circuit obtains an angle from an output of the first integration circuit, and when a change in the obtained angle exceeds a predetermined setting value, the calculation circuit outputs the correction coefficient to the correction circuit indicating that a range in which correction is available has been exceeded.

4. The signal processing device of claim 1, further comprising:
   a low frequency detector configured to detect a low frequency component from the motion detection information, wherein the calculation circuit applies a value of the low frequency component when calculating the correction coefficient.

5. The signal processing device of claim 1, further comprising a second integration circuit configured to calculate a blur angle based on the second angular velocity and the second angle.

6. The signal processing device of claim 1, wherein the correction circuit sets an angle before correction obtained in one earlier calculation to be the angle calculated in the first integration circuit when the motion type information indicates the motion was intended.

7. The signal processing device of claim 1, wherein the calculation circuit calculates the correction coefficient by calculating a current correction coefficient from the motion type information, calculating a difference between the current correction coefficient and a previous correction coefficient, sets the calculated correction coefficient to the current correction coefficient when the difference is lower than a maximum update value and otherwise sets the calculated correction coefficient to the maximum update value.

8. The signal processing device of claim 1, wherein the signal processing device corrects the first angular velocity based on a unique attribute of the gyro sensor before the first angular velocity is input to the first integration circuit.

9. A method for compensating for shaking of an imaging device, the method comprising:
   integrating a first angular velocity detected by a gyro sensor to calculate a first angle;
   determining motion type information indicating whether an angle change was caused by a hand-shake or was intended by a user based on the first angular velocity;
   calculating a correction coefficient based on the motion type information;
   correcting the first angle based on the correction coefficient;
   integrating a second angular velocity detected by the gyro sensor using the corrected first angle, to generate a second angle;
   calculating a blur angle based on the second angle; and
   adjusting image data captured by the image device during the angle change using the calculated blur angle.

10. The method of claim 9, wherein the integrating, determining and calculating only occur if a time elapsed since the imaging device has started being driven is within a predetermined time, and otherwise the correction coefficient is set to a determined value.

11. The method of claim 9, wherein the determining and calculating only occur if a change in the calculated angle exceeds a predetermined setting value, and otherwise the correction coefficient is set to a predetermined value.

12. The method of claim 9, further comprising detecting a low frequency component from the first angular velocity, wherein the calculating of the correction coefficient considers the low frequency component.

13. The method of claim 9, wherein the adjusting comprises synchronizing the image data with the blur angle.

14. A non-transitory computer readable medium configured to store code including instructions executable by a processor to perform a method for compensating for shaking of an image device, the method comprising:
- integrating a first angular velocity detected by a gyro sensor to calculate a first angle;
- determining motion type information indicate whether an angle change was caused by a hand-shake or was intended by a user based on the first angular velocity;
- calculating a correction coefficient based on the motion type information; correcting the first angle based on the correction coefficient;
- integrating a second angular velocity detected by the gyro sensor using the corrected first angle, to generate a second angle;
- calculating a blur angle based on the second angle; and
- adjusting image data captured by the image device during the angle change using the calculated blur angle.

15. The non-transitory computer readable medium of claim 14, wherein the integrating, determining and calculating only occur if a time elapsed since the imaging device has started being driven is within a predetermined time, and otherwise the correction coefficient is set to a determined value.

16. The non-transitory computer readable medium of claim 14, wherein the determining and calculating only occur if a change in the calculated angle exceeds a predetermined setting value, and otherwise the correction coefficient is set to a predetermined value.

17. The non-transitory computer readable medium of claim 14, the method further comprising detecting a low frequency component from the first angular velocity, wherein the calculating of the correction coefficient considers the low frequency component.

* * * * *